Oct. 30, 1934.  C. S. BRAGG  1,978,564
BRAKE DRUM
Original Filed Dec. 31, 1930
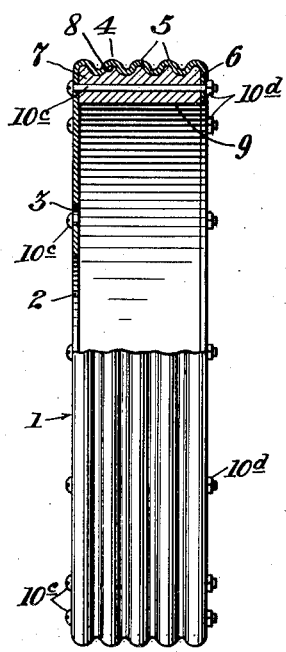
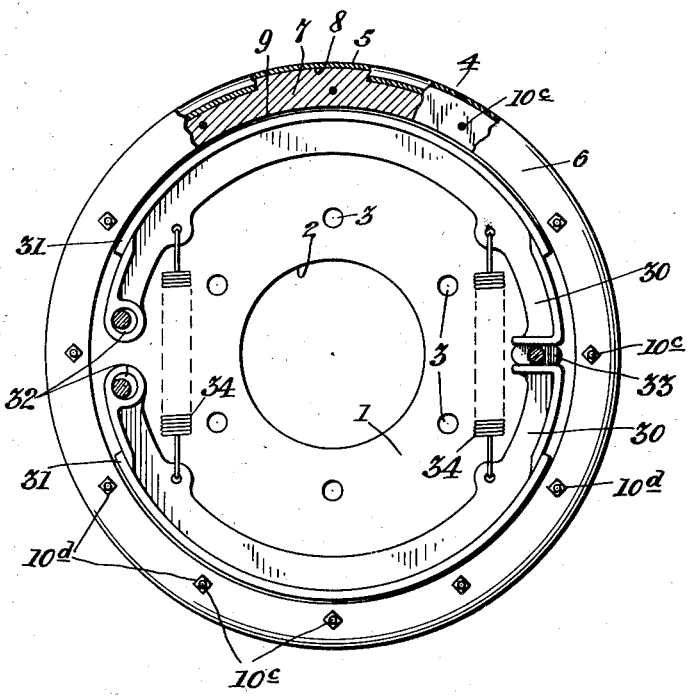

Patented Oct. 30, 1934

1,978,564

UNITED STATES PATENT OFFICE 1,978,564

BRAKE DRUM

Caleb S. Bragg, Palm Beach, Fla.

Original application December 31, 1930, Serial No. 505,821. Divided and this application June 7, 1932, Serial No. 615,786

7 Claims. (Cl. 188—218)

My invention consists in the novel features hereinafter described, reference being had to the accompanying drawing, which shows one embodiment of the same selected by me for purposes of illustration, and the said invention is fully disclosed in the following description and claims.

This application is a division of my former application for Letters Patent of the United States filed December 31, 1930, and given Serial Number 505,821.

My invention consists in a new friction element for use in brake mechanism or clutch mechanism for automotive vehicles, although it may be embodied in any other forms of friction apparatus for any purpose in which its use may be desirable. My invention is particularly advantageous in brake mechanism for automotive vehicles, and especially in the construction of brake drums therefor.

Brake drums formed of sheet steel, stamped or pressed by suitable dies into final form with hub apertures and bolt holes, are used practically on all automotive vehicles except the very heavy models, on account of their lightness and low cost of manufacture. In order to form these drums by stamping or pressing, it is necessary to use a comparatively soft steel, with the result that the braking flanges of the drums are easily scored by frictional engagement with the other braking element, which is usually the brake shoes in the internal expanding type of brake mechanism, or a brake band in the internal expanding type of brake mechanism, or a brake band in the external contracting type of brake mechanism, the former type being more usual as the latter type has been practically abandoned. It has been found that brake shoe pressures, which are otherwise practical, distort the flange into an oval shape, and it has also been found that the frictional heat developed in braking, tends to distort the braking flange of the drum, and in both cases appreciably reduce the area of frictional contact between the drum flange and the opposed braking element, and increase the pressure on the remaining contact surfaces which may cause excessive wear, heat and scoring. It has been proposed to form an angular reinforcing lip at the outer edge of the braking flange, but this does not prevent distortion of the flange between the lip and the body or disc of the drum. It has also been proposed to provide the flange with an exterior L or U shaped reinforcing band. This adds to the cost of manufacture of the drum, and also adds to the weight and does not entirely prevent the distortion of portions of the braking flange adjacent to the reinforcing band.

My invention consists in a brake drum formed preferably of pressed steel or other suitable metal, in sheet or other form provided with an annular braking flange having at one edge attaching portions for securing it to a hub or wheel or other rotary part, which is preferably integral with and extends inwardly from the braking flange, the outer edge of said flange being preferably provided with an inwardly extending annular lip, also preferably integral with the flange, the said flange being of substantially uniform thickness throughout and provided between its edges with distorted portions formed by bending portions thereof while either hot or cold, into different spaced relation to the axis of rotation of the drum, to increase the stiffness of the flange. These distorted portions extend entirely around the braking flange, either interruptedly or continuously, so as to stiffen the flange throughout substantially its entire extent, and are preferably in the form of corrugations extending continuously and circularly around the flange. Obviously these distorted portions appear both on the inner and outer faces of the flange, and the number required will depend upon their size and shape with respect to the flange and lips. The inner face of the drum flange is provided with a friction lining extending entirely around the same between the lip and attaching portion, the flange engaging face of the lining being correspondingly distorted to fit the inequalities of the surface of the drum flange, and its inner face being smooth and cylindrical and coaxial with the axis of rotation of the drum, the said lining being secured to the drum against movement relatively thereto, securing means such as bolts or rivets extending transversely through the lining, and through portions of the drum, and preferably extending through the said lip and the attaching portion of the drum, and clamping the lining between them, and serving to additionally stiffen the drum flange, to prevent transverse expansion of the distorted or corrugated flange, and to assist in radiating the heat of friction from the lining.

According to my present invention the brake drum constructed as described is used in a brake mechanism in connection with opposed brake elements engaging the coaxial cylindrical friction face of the lining, as the shoes of an internal expanding brake mechanism, which shoes may have friction surfaces of metal, or may be provided with friction faces of any other suitable material as preferred.

Referring to the accompanying drawing.

Fig. 1 represents an elevation, partly in section, of the brake drum lining and securing means therefor.

Fig. 2 is a side elevation of an internal expanding brake mechanism including the lined brake drum illustrated in Fig. 1, portions of the drum being broken away and other portions being illustrated in section.

Referring to the form of brake drum illustrated in Figs. 1 and 2, 1 represents the attaching portion of the drum, which, as shown, is in the form of an annular flange extending inwardly from the inner edge of the braking flange, providing the central aperture, 2, and if desired provided with a circular series of bolt holes, 3, 3, or other suitable means whereby the drum may be attached to a wheel hub or other rotary part. 4 represents the braking flange of the drum disposed substantially perpendicularly to the attaching portion, 1, and having annular portions bent alternately outwardly and inwardly, to form circular parallel corrugations, 5, which in this instance are disposed in planes perpendicular to the axis of the drum and extend circularly around the flange coaxially with the drum axis. The outer edge of the braking flange is shown provided with an inwardly bent lip, 6, substantially parallel to the attaching portion or flange, 1. It will be understood that any drum formed of sheet steel or other suitable sheet wrought metal, may be stamped, pressed or rolled into the final form described, from a suitable blank, without any machining. The drum may be first stamped in the usual manner to form the attaching portion and the cylindrical flange portion. The central hub aperture and the bolt holes may be punched or formed before or after the formation of the braking flange, the hub aperture being coaxial with the flange, so that the drum may be centered and rotated by attaching it to a rotary part. The corrugations or distorted portions may be formed in the flange by means of suitable opposed rollers or the like, and preferably successively from the edge adjacent to the attaching portion outwardly to avoid thinning the metal of the flange, 4, after which the lip, 6, may be pressed or rolled or bent over into the position shown in Figs. 1 and 2, or the corrugations or distorted portions may be pressed or formed in any other desired way, and by any other desired means, as preferred. It will be readily understood that the circular corrugations, 5, or distorted portions formed in the braking flange, 4, will impart great strength and rigidity to the flange, which is further strengthened by the inturned lip, 6, so that without materially increasing the weight of the drum or the thickness of the metal from which it is formed, the strength and rigidity of the flange is greatly increased, so that it will resist all braking pressures, as well as the heat to which it may be subjected without appreciable distortion.

In carrying out my present invention, the distorted or corrugated braking flange of the drum is provided with a friction lining, indicated at 7, the outer face of which conforms to the distorted inner face of the braking flange, 4, and is shown in this instance as provided with circular expanding corrugated portions, 8, fitting the corrugated portions, 5, of the drum flange, the said lining being located between the lip, 6, and the attaching portion, 1, of the drum, and extending entirely around the inner face of the flange, 4. The inner face, 9, of the lining is smooth, and when the lining is in place within the drum, it will form a cylindrical friction surface coaxial with the axis of rotation of the drum to engage the brake shoes of an internal expanding brake mechanism. The lining, 7, may be formed of any suitable material, the particular composition of the lining forming no part of my present invention. The brake lining, 7, may be formed in suitable lengths corresponding with the internal periphery of the drum flange, and inserted therein, or the lining may be molded and completely formed in situ in proper relation to the drum and provided with an inner friction surface coaxial with the axis of rotation of the drum, and solidified or hardened in position therein, as set forth in my former application filed January 10th, 1931, and given Serial Number 507,905.

In order to firmly secure the lining with respect to the braking flange I employ means such as bolts or rivets extending through the lining transversely thereof or through portions of the drum, and preferably extending through the attaching portion, 1, and the inwardly projecting lip, 6, of the brake drum, as shown for example in the drawing, in which the lining, 7, is rigidly secured in position by means of a circular series of bolts, 10c, extending through the attaching portion, 1, of the drum, through the lining, 7, and through the lip, 6, and provided with nuts, 10d, by which they may be tightened so as to firmly clamp the lining between the lip and the attaching portion of the drum. Where the lining, 7, is formed in situ, the bolts, 10c and nuts, 10d, can be placed in engagement with the drum before the formation of the lining, which will then be formed, so as to entirely surround the bolts and firmly anchor the lining to the drum. Where the securing means extend transversely through the lining and through the lip, 6, and attaching portion, 1, of the drum, they will prevent the transverse expansion of the corrugated drum flange by the heat, and will also serve to assist in radiating heat from the lining. In addition, these transversely disposed securing devices or bolts also serve in conjunction with the lining to impart additional stiffness to the drum structure.

In Fig. 2 I have illustrated in a side elevation, partly in section, a complete brake assembly comprising the brake drum illustrated in detail in Fig. 1, in association with the other elements of an expanding brake mechanism of an internal expanding brake mechanism. 30, 30, represent the usual expanding brake shoes, which may be of any desired construction, and are provided with smooth friction surfaces, 31, to engage the coaxial friction surface of the lining, 7, of the corrugated braking flange. The friction surfaces of the shoes are preferably of metal and may be of any desired degree of hardness. The friction surfaces may be integral with the shoes, or they may be in the form of linings of metal or other suitable material secured to the shoes in any preferred or usual manner. In this instance each of the shoes is shown pivotally mounted at one end upon an eccentric pivot, 32, rigidly but adjustably secured to a supporting plate (not shown) adapted to be bolted to a non-rotatable member in a well known manner, and the opposite ends of said shoes engage the usual expanding cam, 33, the said shoes being normally held in retracted position by springs, 34. The particular mounting and means for expanding the particular brake shoes form no part of my present invention.

It will be understood that the braking element which is worn away by friction in use may be either the lining of the drum or the brake shoes, or both. If the lining is to receive the greater wear, the drum may be relined when necessary.

If, on the other hand, the brake shoes are constructed to wear more rapidly than the brake lining, the shoes may be replaced or provided with new friction surfaces when sufficiently worn.

It will be apparent that the drum herein shown and described can be very cheaply made and will at the same time be extremely strong, durable and efficient. The pressed braking flange is greatly strengthened and stiffened by the distorted portions or corrugations extending throughout substantially the entire extent of the flange, as well as by the inturned annular lip, and the molded lining which engages the entire inner distorted face of the drum flange is rigidly held in relation thereto by the circular series of transversely extending securing devices, which rigidly connect the lining with the drum, and where, as in the preferred form of my invention herein shown, these transverse securing devices extend through the lining and through the flanges at the inner and outer edges thereof, to wit, the lip and attaching portions of the drum, they not only clamp the lining transversely between said flanges, but positively prevent any lateral expansion of the distorted or corrugated drum flange.

It is to be understood that the distorted portions of the drum flange instead of being in the form of parallel circular corrugations, as herein shown, may be in non-continuous form, as series of bumps or dents, with or without perforating the metal of the flange, and extending in a line or lines around the braking flange, and sufficient in number, size and relation, to reinforce and stiffen the flange, as previously described and as illustrated in my former application of which this is a division.

It will also be noted that the heat of friction will be partially absorbed by and dissipated from the body of metal in the brake shoes while such heat as may be transmitted through the brake lining to the transversely corrugated braking flange will have no appreciable effect in distorting either the braking flange or the friction surface of the brake lining within the same, so that the area of surface contact between the braking elements is not affected by the heat of friction, and the efficiency of the brakes remains constant under all conditions. Furthermore, the increased strength of the transversely corrugated braking flange of the drum prevents any appreciable distortion of the flange due to braking pressure applied thereto or the heat of friction, and the corrugations increase the heat radiating surface area of the flange. Moreover, the transverse bolts, rivets or other securing devices extending through the lining, assist in radiating heat therefrom, and prevent lateral expansion of the braking flange.

It will also be understood that any variations or inaccuracies in the formation of the drum will be compensated for by the lining, the inner face of which can always be brought into true cylindrical form coaxial with the axis of rotation of the drum.

What I claim and desire to secure by Letters Patent is:

1. A wrought metal brake drum provided with an annular braking flange, provided at one edge with an inwardly extending attaching portion substantially perpendicular to said braking flange, said braking flange being provided at its other edge with an inwardly extending annular lip, an annular friction lining engaging the inner face of said braking flange and located between and having its lateral edges engaging the inner faces of said annular lip and said attaching portion, and securing means extending through said lining substantially parallel to the axis of rotation of the drum, and connecting said lip and attaching portion.

2. A pressed sheet metal drum having an annular braking flange provided throughout its entire circular extent with distorted portions for stiffening said flange, said distorted portions being disposed in lines extending circularly around the drum, and correspondingly effecting both the inner and outer faces of the braking flange, said braking flange being provided with inwardly extending attaching portions at one edge and with an annular inwardly extending lip at the other edge, a molded friction lining engaging the inner face of said braking flange and having its outer face in contact with the inner face of the braking flange throughout its entire extent and conforming to the distorted portions of said braking flange, the lateral edges of the lining engaging respectively said lip and said attaching portions, and securing means extending through said lining substantially parallel with the axis of the drum and through said lip and attaching portions.

3. A brake drum formed of wrought metal and having an annular braking flange provided at each edge with inwardly extending portions, the said braking flange being provided throughout its entire circular extent with distorted portions for stiffening said flange, a brake lining engaging the inner distorted face of the braking flange and lying between said inwardly extending portions of the drum, and connecting means extending through said lining and through the said inwardly projecting portions of the drum to clamp the lining between said inwardly extending portions of the drum and prevent transverse expansion of the distorted braking flange thereof.

4. A pressed sheet metal brake drum having an annular braking flange provided at each edge with inwardly extending portions, one of which is provided with means for connecting it with a rotary part, said braking flange being provided with distorted portions arranged in lines extending circularly around the flange, a brake lining engaging the distorted inner face of the braking flange, and a circularly disposed series of securing means extending transversely through the lining and through said inwardly extending portions of the drum, for clamping the lining between said inwardly extending portions and preventing transverse expansion of the braking flange.

5. A pressed sheet metal brake drum comprising an annular attaching portion, and an integral annular braking flange disposed substantially perpendicularly thereto, and of substantially uniform thickness throughout, said flange having corrugations formed therein extending circularly around the flange in lines coaxial with respect to the axis of the drum, a friction lining engaging the corrugated inner face of the braking flange and having its inner face substantially cylindrical and coaxial with the axis of rotation of the drum, and a circular series of connecting means extending transversely through the lining and through said attaching portion of the drum.

6. A pressed sheet metal brake drum comprising an annular attaching portion, provided with means for attaching it to a rotary part, an integral annular braking flange disposed substantially perpendicularly to said attaching portion and of substantially uniform thickness throughout, said flange having corrugations formed therein and extending circularly around the flange in lines coaxial with respect to the axis of the drum, said flange being provided at its outer edge with an inwardly extending annular lip, a friction lining engaging the corrugated inner face of said braking flange between said lip and said attaching portion, and having its inner friction face substantially cylindrical and coaxial with the axis of rotation of the drum, and a circular series of clamping means extending transversely through said lip, lining and attaching portion, for clamping the lining between said lip and attaching portion, and preventing transverse expansion of the corrugated braking flange.

7. A pressed sheet metal drum serving as a mold for forming the lining in situ therein, comprising an annular attaching portion provided with means for attaching it to a rotary part, an integral annular braking flange disposed substantially perpendicularly to said attaching portion and of substantially uniform thickness throughout, said flange having corrugations formed therein and extending circularly around the flange in lines parallel to each other and coaxial with respect to the axis of the drum, said flange being provided at its outer edge with an inwardly extending annular lip, a friction lining engaging the corrugated inner face of said braking flange between said lip and said attaching portion and having its inner friction face substantially cylindrical and coaxial with the axis of rotation of the drum and its outer fitting the corrugations of the inner surface of said flange, and a circular series of clamping means extending transversely through said lip, the said lining and said attaching portion, for clamping the lining between said lip and attaching portion.

CALEB S. BRAGG.